United States Patent
Shiell et al.

(10) Patent No.: US 8,933,928 B2
(45) Date of Patent: Jan. 13, 2015

(54) MULTIVIEW FACE CONTENT CREATION

(75) Inventors: Derek Shiell, Los Angeles, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 593 days.

(21) Appl. No.: 13/303,044

(22) Filed: Nov. 22, 2011

(65) Prior Publication Data
US 2013/0127827 A1 May 23, 2013

(51) Int. Cl.
*G06T 15/00* (2011.01)
*G06T 17/00* (2006.01)
*G06T 15/20* (2011.01)

(52) U.S. Cl.
CPC ............... *G06T 17/00* (2013.01); *G06T 15/205* (2013.01)
USPC ........................................ 345/419

(58) Field of Classification Search
None
See application file for complete search history.

(56) References Cited

U.S. PATENT DOCUMENTS

| | | | | |
|---|---|---|---|---|
| 6,556,196 B1 * | 4/2003 | Blanz et al. | .................... | 345/419 |
| 6,879,323 B1 * | 4/2005 | Takezawa et al. | ............. | 345/420 |
| 7,454,039 B2 * | 11/2008 | Tu et al. | ......................... | 382/115 |
| 8,009,171 B2 * | 8/2011 | Nakahashi | .................... | 345/473 |
| 2005/0031195 A1 * | 2/2005 | Liu | ................................ | 382/154 |

OTHER PUBLICATIONS

Zhang, J., et al., "Sample based 3D face reconstruction from a single frontal image by adaptive locally linear embedding", Journal of Zhejiang University, Science A, vol. 8, No. 4, pp. 550-558, 2007.
Breuer, P., et al., Automatic 3D Face Reconstruction from Single Images or Video, Automatic Face & Gesture Recognition, 2008. FG '08. 8th IEEE International Conference, Feb. 2007.
Cootes, T.F., et al., "View-Based Active Appearance Models", Automatic Face and Gesture Recognition, 2000, Proceedings, Fourth IEEE International Conference, Mar. 28-30, 2000.
Mittrapiyanuruk, P., et al., "Calculating the 3D-Pose of Rigid-Objects Using Active Appearance Models", IEEE International Conference in Robotics and Automation, 2004.
Kim, Y. J., et al., "3D Face Modeling based on 3D Dense Morphable Face Shape Model", World Academy of Science, Engineering and Technology 37, 2008.
Zhu, J., et al., "Automatic 3D Face Modeling Using 2D Active Appearance Models", Proceedings of the 13th Pacific Conference on Computer Graphics and Applications, 2005.

* cited by examiner

*Primary Examiner* — Edward Martello

(57) ABSTRACT

New views of a 2D image are generated by identifying an object class within the image, such as through a face detector. The face is then fitted to a model face by means of an AAM, and the results extended to a fitted 3D polygon mesh face. A boundary perimeter with predefined anchor points and a predefined triangulation with the 3D polygon mesh is defined a predefined depth distance from the depth center of known landmarks within the 3D polygon mesh face. By rotating the 3D polygon mesh face relative to the boundary perimeter, which may follow the perimeter of the input image, new views of the input image are generated.

20 Claims, 7 Drawing Sheets

MULTIVIEW FACE CONTENT CREATION

BACKGROUND

1. Field of Invention

The present invention relates to the synthesizing of new views of an object from existing images. More specifically, it relates to the creating of a new gaze direction for a human subject in an image.

2. Description of Related Art

When one communicates over a computer network using an audio/video link, but one wishes to maintain some level of personal anonymity, it is a common practice to make use of a computer avatar. In computing, an avatar is the graphical representation of the user or the user's alter ego or character. It may take either a three-dimensional (3D) or a two-dimensional (2D) form.

A form of avatar growing in popularity is a 3D graphic representation of the head of the user. The graphic representation need not be an accurate rendition (i.e. it may be an alter-ego rendition), but it is generally desirable that the avatar's facial expression and head/face movement mimic that of the user.

Lately, there has been a push toward creating more accurate representations of a user. This has led to the development of techniques for rendering 3D representations from 2D images, such as those taken by a computer network audio/video communication link, i.e. by a 2D computer camera.

An example of a technique for rendering a 3D model is described in *3D Face Modeling based on 3D Dense Morphable Face Shape Model*, World Academy of Science, Engineering and Technology 37, 2008, by Kim et al. In this approach, a predefined 3D face model is used to generate a 3D face model from a sequence of images. The 3D model can then be used to render the face from new angles.

As it is known in the art, an active appearance model (AAM) has successfully been used in the past for identifying human faces. An example of introducing the idea of using AAM in a 3D-related application is illustrated in *Calculating the 3D-Pose of Rigid-Objects Using Active Appearance Models*, IEEE International Conference on Robotics and Automation, 2004, by Mittrapiyanuruk et al. This paper, however is not applied to human faces, and instead is concerned with estimating the pose of a rigid objects.

An effort to extend the use of AAMs in 3D face applications is shown in *View-Based Active Appearance Models*, Automatic Face and Gesture Recognition Proceedings, Fourth IEEE International Conference, 2000, to Walker et al. This paper describes an AAM modeling scheme that includes creating multiple AAM models trained on different view angles of a face so as to facilitate the recognition of a face from different angles. The system can generate novel views of a face, but does not contain 3D shape information.

It would be advantageous to simplify the generation of 3D models from a given 2D image.

SUMMARY OF INVENTION

Applicants put forth that an advantageous use of a technique for generating 3D representations of 2D images is in the rendering of novel 2D or 3D images of a given object class. As it would be understood, an object class may refer to an object category, such as a human face, a specific body organ, an animal or plant specie or any of its parts, an inanimate object, etc. Basically, given a 2D image (still image or video image); it is desirable to generate new views not captured by the original 2D image. This can be achieved, for example, by creating a 3D model of a predefined object class, and then rotating the identified object within the existing image to its alter pose direction. As it would be understood, this would entail integrating addition information not found in the original 2D image.

The generation of new information for generating additional views typically requires intensive human interaction. It is an object of the present invention to provide a system/process for automating the identifying of a given object class, generating a 3D model of the identified object tied to the original image, and creating new views of the identified object within the original image.

It is a further object of the present invention to make use of AAM techniques in creating these novel views.

The above objects are met in a multi-view image synthesis method for generating multiple views of an input image, the method having the following steps: (a) accessing the input image; (b) applying an auto-detection process to the input image for detecting a predefined object-class; (c) in response to the auto-detection process detecting a target image region within the input image that corresponds to the predefined object-class, aligning the target image region to a predefined 3-dimensional (3D) polygon mesh of the predefined object-class; (d) coupling the aligned target image to a boundary shape defined on the input image, the boundary shape having predefined anchor points for coupling to outer vertices of the aligned target image; and (e) rotating the aligned target image in accordance with a rotation of the 3D polygon mesh and in accordance with its triangulation with the anchor points, and replacing the target image region with the rotated aligned target image within the input image.

In the above method, it is preferred that the input image be a two-dimensional (2D) image. Additionally, the auto-detection process is preferably a face detection process and the predefined object-class is a human face. If desired, the polygon mesh may be a triangle mesh. Further preferably, the predefined 3-dimensional (3D) polygon is predefined to be projected out from the 2D plane of the input image (i.e. from the input image plane).

Additionally in a preferred embodiment, the predefined 3D polygon mesh of the predefined object-class has a plurality of predefined landmarks; and the anchor points are defined to lie on a plane a predefined distance from the depth center of the landmarks.

To facilitate its implementation, a pre-defined triangulation between the predefined 3D polygon mesh and the predefined anchor points may be used. In this case, step (d) would use the pre-defined triangulation to couple the aligned target image to the anchor points.

The boundary shape may be implemented in several ways. For example, the boundary shape may be of arbitrary size superimposed on the input image and smaller than the input image. Optionally, the boundary shape may include the entirety of the input image. Alternatively, the boundary shape may be defined to align with the perimeter of the input image.

The final image may be improved by further including in step (e), a sub-step of estimating texture and lighting parameters of polygons that come into view as the aligned target image is rotated based on an analysis of texture and lighting parameters of polygons that that were visible prior to the rotating of the aligned target image.

The above objects are also met in a multi-view image synthesis system for generating multiple views of an input image, the system having: (a) an input for accessing the input image; (b) a first data processing block for applying an auto-detection process to the input image for detecting a pre-defined object-class; (c) a second data processing block for, in response to the first data processing block detecting a target image region within the input image that corresponds to the predefined object-class, aligning the target image region to a predefined 3-dimensional (3D) polygon mesh of the predefined object-class; (d) a third data processing block for coupling the aligned target image to a planar boundary shape defined on the input image, the planar boundary shape having predefined anchor points for coupling to outer vertices of the aligned target image; (e) a fourth data processing block for rotating the aligned target image in accordance with a rotation of the 3D polygon mesh and in accordance with its triangulation with the anchor points, and replacing the target image region with the rotated aligned target image within the input image.

Preferably, the input image is a two-dimensional (2D) image. Additionally, the auto-detection process may be a face detection process and the predefined object-class may be a human face. It is further to be understood that the polygon mesh may be a triangle mesh.

In a preferred implementation, the predefined 3D polygon mesh of the predefined object-class has a plurality of predefined landmarks, and the anchor points are defined to lie on a plane a predefined distance from the depth center of the landmarks. Additionally, the system may have a pre-defined triangulation between the predefined 3D polygon mesh and the predefined anchor points, wherein the third data processing block uses the pre-defined triangulation to couple the aligned target image to the anchor points.

It is further to be understood that the planar boundary shape may be of arbitrary size superimposed on the input image. For example, the planar boundary shape may include the entirety of the input image, or may be smaller than the input image. Alternatively, the planar boundary shape might be defined to align with the perimeter of the input image.

In a preferred implementation, the fourth data processing block may further estimate texture and lighting parameters of polygons that come into view as the aligned target image is rotated, based on an analysis of texture and lighting parameters of polygons that were visible prior to the rotating of the aligned target image.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
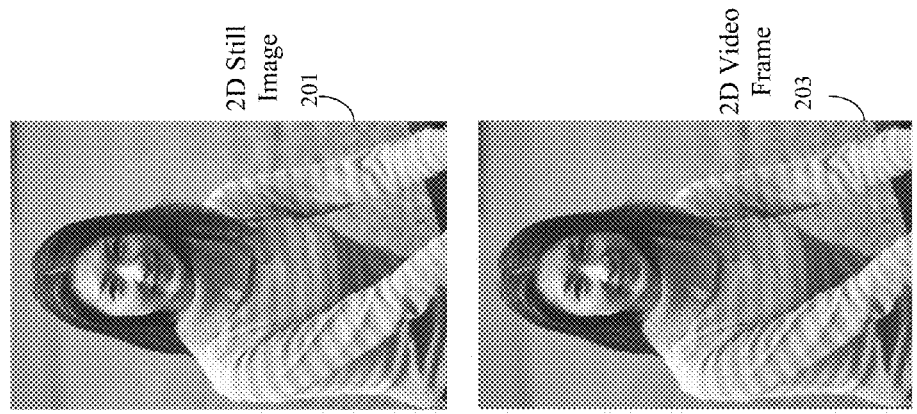
FIG. 1 shows an example of a 2D still image and a 2D video frame image.

With reference to FIG. 1, still images (such as still image 201) and video frame images (such as video frame image 203) from a video sequence are often generated in two-dimensions (2D). It is presently proposed that it is desirable to generate three-dimensional (3D) representations of such 2D still images and 2D video frame images (i.e. videos). It has also been found that sometimes the subject of such still images and videos have a gaze direction that is less than desirable. Since it is often too difficult or impractical to restage a still image, or video, shot where the subjects are not looking at the camera, such images are often left in their less-than-optimal state. It is proposed that it would be desirable to be able to modify an existing still image or video to correct for gaze direction and thereby improve an otherwise desirable camera shot.

As it is to be understood, attempting to modify an existing image (i.e. still image or video sequence image) and achieve these desired effects requires generating new information not found in the existing image. Previous attempts have required extensive intervention by a human operator and/or creation of customized models designed for individual human subjects within an image. The present invention proposes a system/method for automating such modifications in a general-purpose manner that is suitable for any number of subjects of a given class of object (herein after, object-class), such as human faces or other object-classes.

For ease of explanation, the following discussion assumes that the object-class sought in each image is a human face, but any other class of object is envisioned within the scope of the present invention. Such variation is considered within the scope of those versed in the art.

The present invention seeks to synthesize multiple face views from a single (preferably 2D) image for 3D content generation. The generated 3D content can then be extended to 3D printing and/or 3D display applications. It may further be extended to gaze correction. This gaze correction may be made within the single 2D image to create a new 2D image.

A basic idea of the present invention is to use 3D shape information from active appearance model (AAM) alignment (or other modeling method/tool) to generate multiple views of the face(s) within a single image. For example in FIG. 2, an object-class, auto-detection, data processing block 207 may be used for receiving/accessing an input image 205 from which new image information is to be generated. Auto-detection block 207 may be an AAM, and be optimized for identifying a predefined class of object. In the presently preferred embodiment, auto-detection block 207 is optimized to detect human faces and to align (or fit or warp) each detected human to a model face (i.e. mean face, or other prescribed model image) defined by its modeling method (i.e. defined by the AAM, in the present example). Additional information on a suitable AAM system may be found in "L1-Optimized AAM Alignment", U.S. patent application Ser. No. 12/961,347, assigned to the same assignee as the present invention, and herein incorporated in its entirety by reference. Each fitted 3D polygon mesh face is then aligned to a 3D polygon mesh by 3D polygon mesh alignment (data processing) block 209 to produce a fitted 3D polygon mesh face. Additional information on creation of a 3D polygon mesh face is provided in, "Improving Object Model Fitting Using Manifold Constraints", U.S. patent application Ser. No. 12/392,849, assigned to the same assignee as the present invention, and herein incorporated in its entirety by reference. It is to be understood that 3D polygon mesh alignment block 209 and object-class auto-detection block 207 may be integral parts of a specialized AAM, and thus incorporated into a single unit.

The present invention preferably makes use of a boundary shape with predefined anchor points to establish a depth reference point for each fitted 3D polygon mesh face. The boundary shape is preferably coupled to a fitted 3D polygon mesh face through triangulation by a boundary shape triangulation coupler block 211. Further, preferably, this triangulation is pre-established so as to speed up its implementation. Additionally, because of this known triangulation, the pose position of the identified face (or other class object) is immediately known relative to the boundary shape.

For ease of discussion, the following assumes a single face in input image 205. It is to be understood that the present invention may be extended in a straight-forward manner to an input image with a plurality of faces (i.e. multiple instances of a given object-class).

Figure 3:
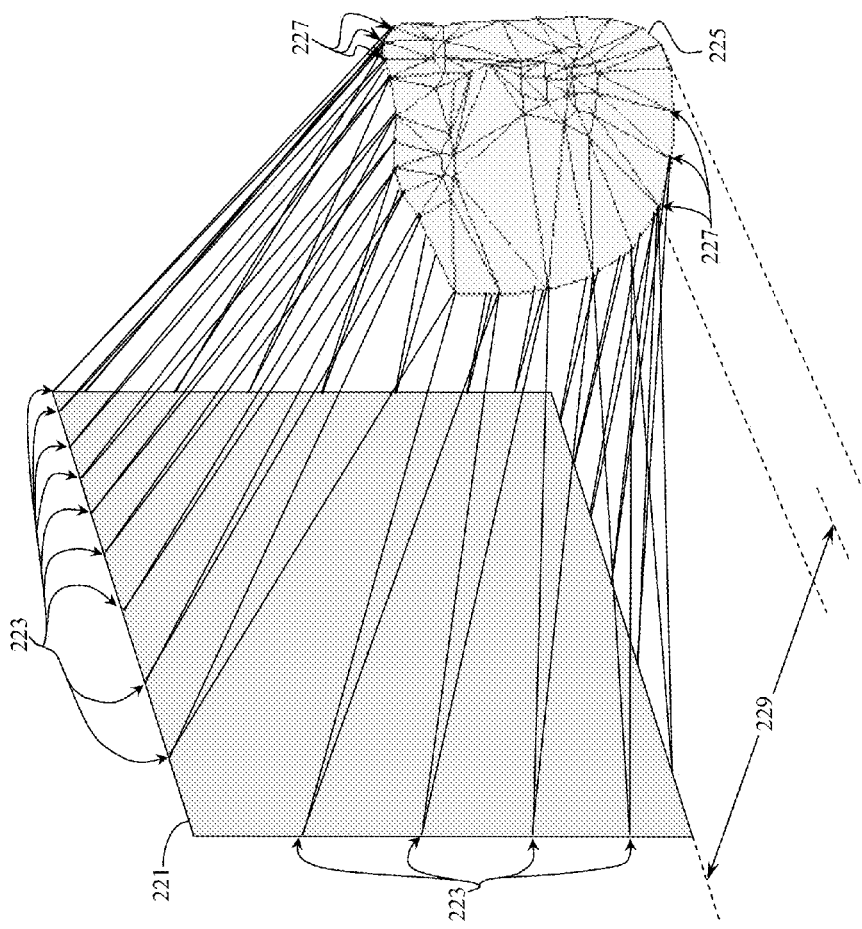
FIG. 3 provides a perspective view illustrating the depth separation of a predefined boundary shape relative to a fitted 3D polygon mesh face.

With reference to FIG. 3, as an illustration, a boundary shape 221 is preferably defined to be planar with predefined anchor points 223 (i.e. fixed points along the perimeter of boundary shape 221). In the present illustration, a fitted 3D polygon mesh face 225 is shown to have a triangle mesh, as a preferred implementation of a polygon mesh. It is to be understood that other polygon mesh types are equally suitable. Fitted 3D polygon mesh face 225 preferably projects out (i.e. in front) from the boundary shape 221 (i.e. from the image plane) by a predefined (and optionally fixed) depth amount. Preferably, outer perimeter vertices 227 of fitted 3D polygon mesh face 225 are triangulated to anchor points 223 in a predefined fashion. By predefining the triangulation between vertices 227 and anchor points 223, the coupling of fitted 3D polygon mesh face 225 to boundary shape 221 is established as soon as fitted 3D polygon mesh face 225 is defined.

Fitted 3D polygon mesh face 225 preferably has a series of predefined landmarks, such as for example, the ears centers, eye pupils, nostrils, corners of the mouth, etc. Further, preferably, boundary shape 221 is defined to reside a predefined distance (i.e. depth) 229 from the depth center of these landmarks. This permits for more natural rotation of fitted 3D polygon mesh face 225 relative to boundary shape 221. Therefore, it is preferred that the plane of boundary shape 221 be parallel to (and optionally coincide with) the plane of input image 205. Basically, it is preferred that the reference view of an observer of input image 205 be normal to the plane of boundary shape 221.

Figure 2:
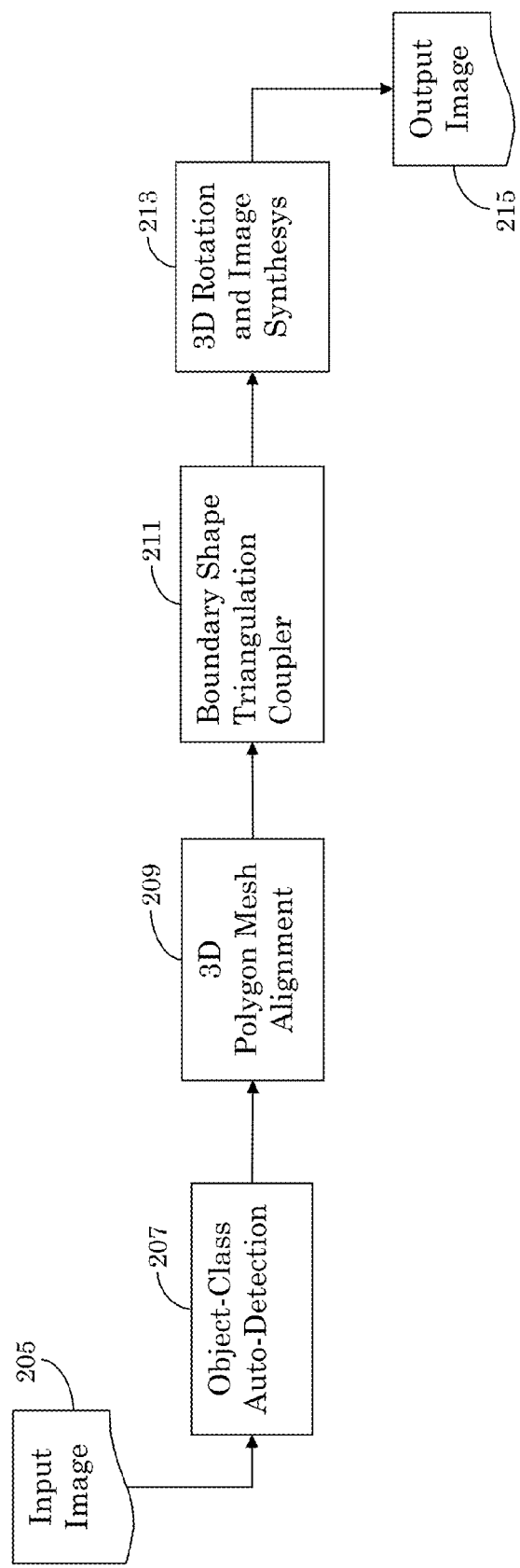
FIG. 2 is a block diagram of a system in accord with the present invention.
Figure 4:
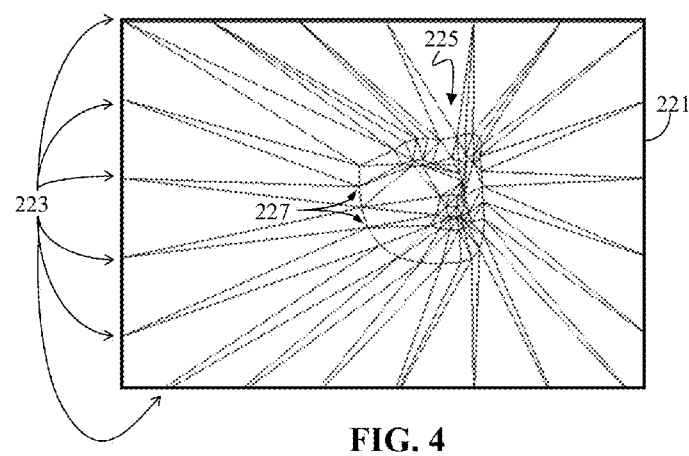
FIG. 4 illustrates a normal view (i.e. perpendicular view) of a boundary shape relative to a fitted 3D polygon mesh face.

An example of this reference view normal to the plane of boundary shape 221 is illustrated in FIG. 4, where all elements similar to FIGS. 1-3 have similar reference characters and are described above. Preferably, boundary shape 221 is a planar boundary, i.e. a boundary plane. Fitted 3D polygon mesh face 225 is shown triangulated to boundary shape 221 at various anchor points 223.

Returning to FIG. 2, once fitted 3D polygon mesh face 225 is triangulated to boundary shape 221 by boundary shape triangulation coupler block 211, an image generation, data processing block 213 rotates fitted 3D polygon mesh face 225 relative to triangulated boundary shape 221. Because the position of fitted 3D polygon mesh face 225 relative to the rest of input image 205 is already defined by the triangulation of boundary shape 221, the newly rendered view is automatically placed in its correct location within input image 205 to produce an output image 215.

Preferably, as fitted 3D polygon mesh face 225 is rotated and previously unseen parts of it come into view, image generator block 221 estimates texture and lighting parameters of polygons (i.e. triangles) that come into view based on an analysis of texture and lighting parameters of polygons that were visible prior to the rotating of the aligned target image.

Figure 5:
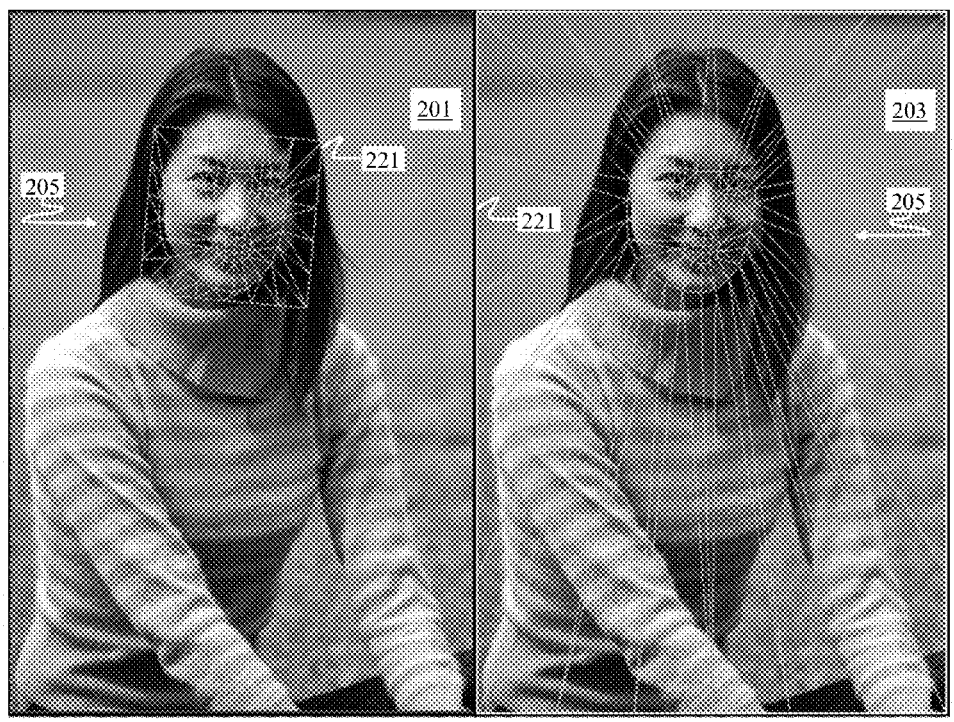
FIG. 5 illustrates two examples of a fitted 3D polygon mesh face triangulated to a reference boundary shape. In one embodiment, the boundary shape is made to outline the 2D face region within an input image 201 fitted to the 3D polygon mesh face 225, and in an alternative embodiment, the boundary shape is made to coincide with the perimeter of the input image 203.

To recapitulate with reference to FIG. 5, once a face (or other sought object-class) is identified within an input image, such as still image 201 or video frame image 203, the identified face is fitted to a model face by, for example an AAM machine. It is to be understood that faces within an input image may be identified by, for example, a face detection algorithm, as is known in the art. The fitted 3D polygon mesh face 225 is then triangulated to a reference boundary shape, or boundary plane, 221 having predefined anchor points and displaced a predefined distance from the depth center of predetermined landmarks of the fitted 3D polygon mesh face 225. If desired, the outer vertices of fitted 3D polygon mesh face 225 may be triangulated to boundary plane 221 by means of a predefined triangulation. As shown, boundary plane 221 may be made to surround the fitted 3D polygon mesh face 225 within an input image, as illustrated in still image 201, or may be made to coincide with the perimeter of the input image, as illustrated in video frame image 203.

In summary, anchor points are added along the preferably rectangular boundary 221 in the input image. Rectangular boundary (or region) 221 may include the entire input image (as shown in input image 203) be an arbitrary size (as shown in input image 201) surrounding each detected face. Preferably, a pre-defined triangulation is used to identify vertices of the fitted 3D polygon mesh face 225 and efficiently triangulate it to the anchor points on the rectangular boundary 221. Theses anchor points are defined to lie on an arbitrary plane a certain distance from the depth center of the 3D face landmarks of the fitted 3D polygon mesh face (or model face). This depth offset allows 3D rotation to look more natural. That is, the depth offset may be tuned (i.e. adjusted/modified) to achieve a more natural look to the rotation of the face. Tuning is achieved by changing (i.e. shifting) the position of the landmarks in the depth direction (z) towards an observer, (i.e. changing the depth of the landmarks in the depth direction). The depth offset makes rotation look more natural.

Furthermore, the perspective transform and view offsets can be adjusted. For example, perspective can be changed by changing the position of the observer (i.e. a virtual camera position) and re-rendering the scene, as illustrated in FIG. 7.

Figure 6:
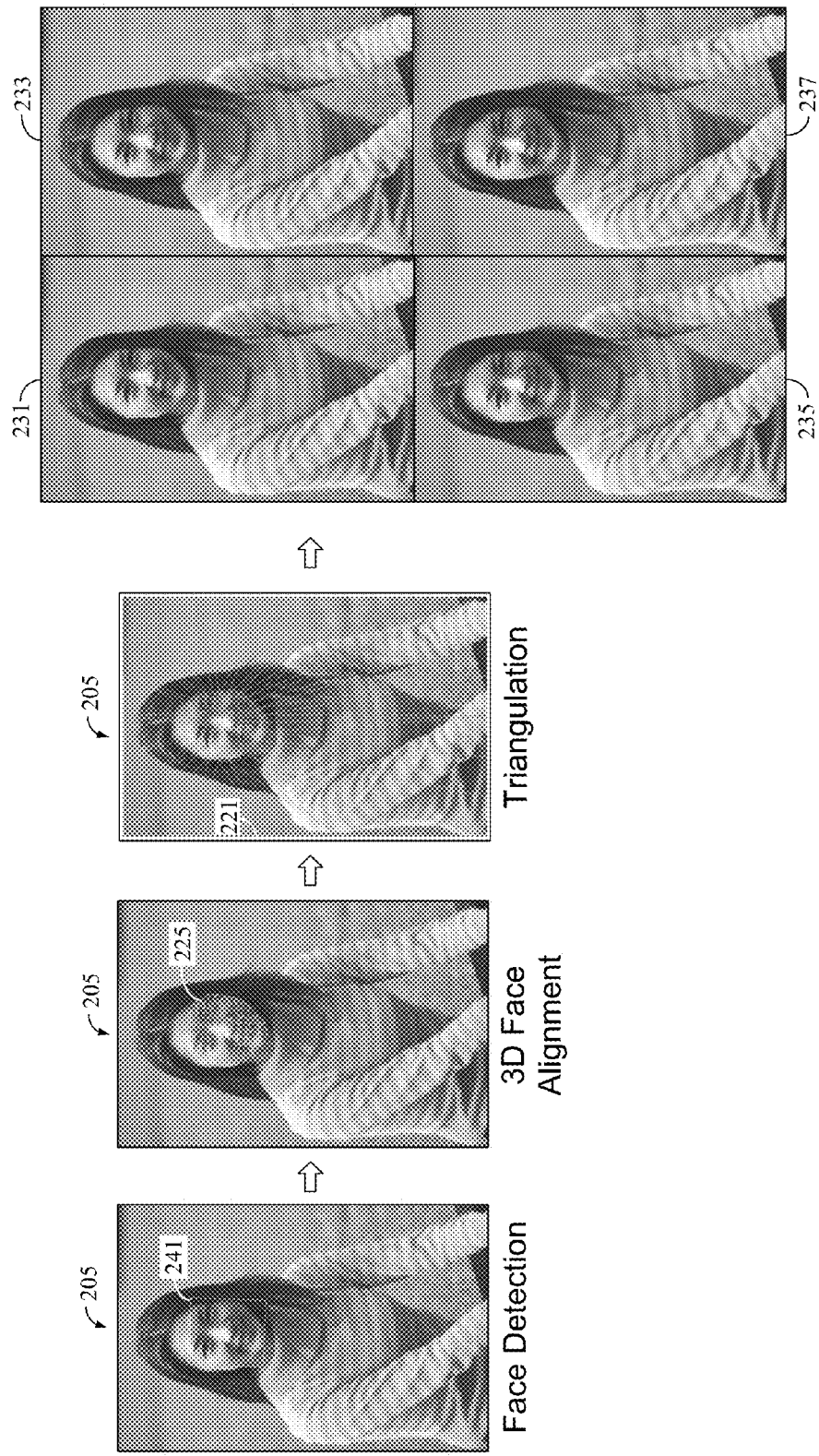
FIG. 6 illustrates a process flow in accord with the present invention.

With reference to FIG. 6, where all elements similar to those of FIGS. 1-5 have similar reference characters and are described above, a process flow of the present invention basically uses 3D shape information from AAM alignment (or other modeling method) and artificial triangulation with anchor points (preferably along a rectangular boundary 221) to generate multiple plausible views of a face from a single input image 205 (for example still image 201 or video frame image 203). These multiple plausible views define corresponding multiple output images 231-237.

In FIG. 6, input image 205 is first subjected to a face detection operation (or data processing block) to identify a human face 241. 3D face alignment then results in fitted 3D polygon mesh face 225. A triangulation operation then triangulates fitted 3D polygon mesh face 225 to anchor points along rectangular boundary 221. In the present example, rectangular boundary 221 is aligned the perimeter of input image 205.

Figure 7:
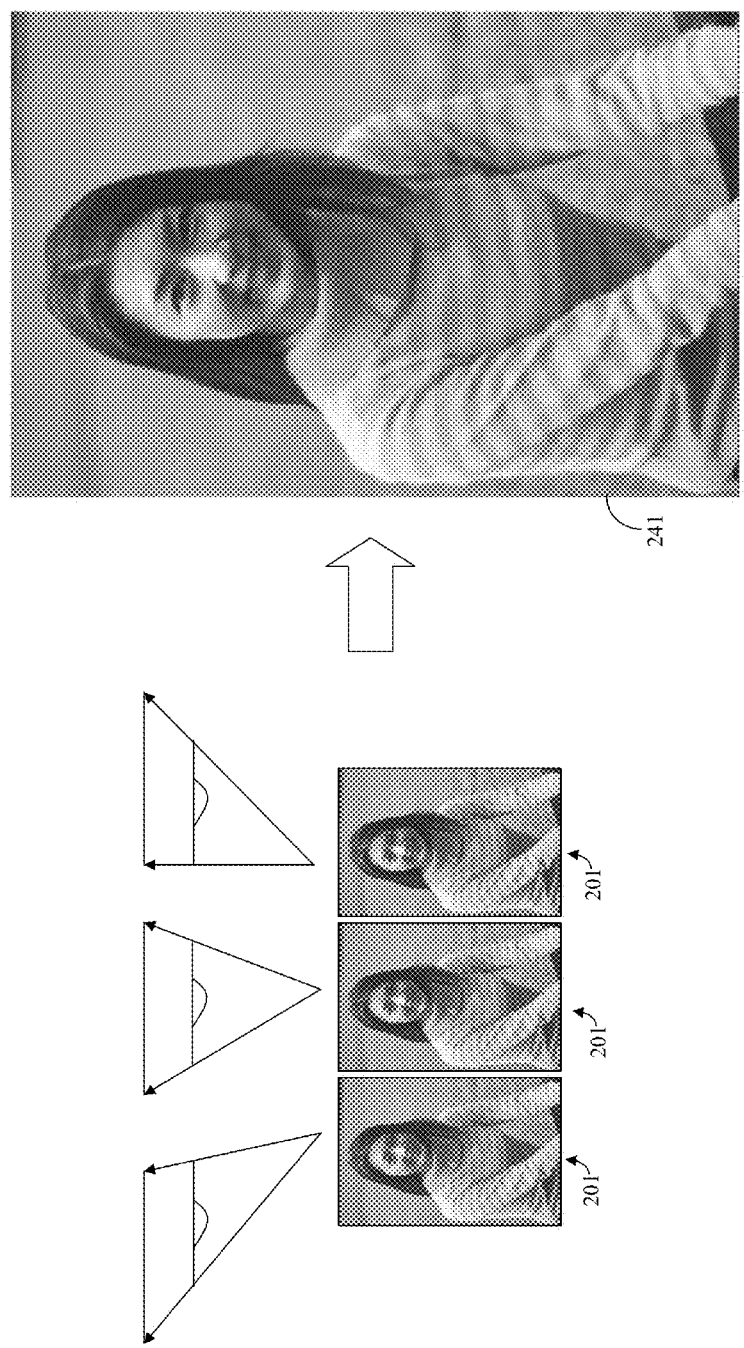
FIG. 7 illustrates the translating of a face within an input image through a virtual view box (i.e. rectangular boundary) to create new views.

FIG. 7 illustrates the translating of a face within an input image through the virtual view box to create new views (such as from different perspective angles, for example). A close-up of a final view is shown as output image 241.

Figure 8:
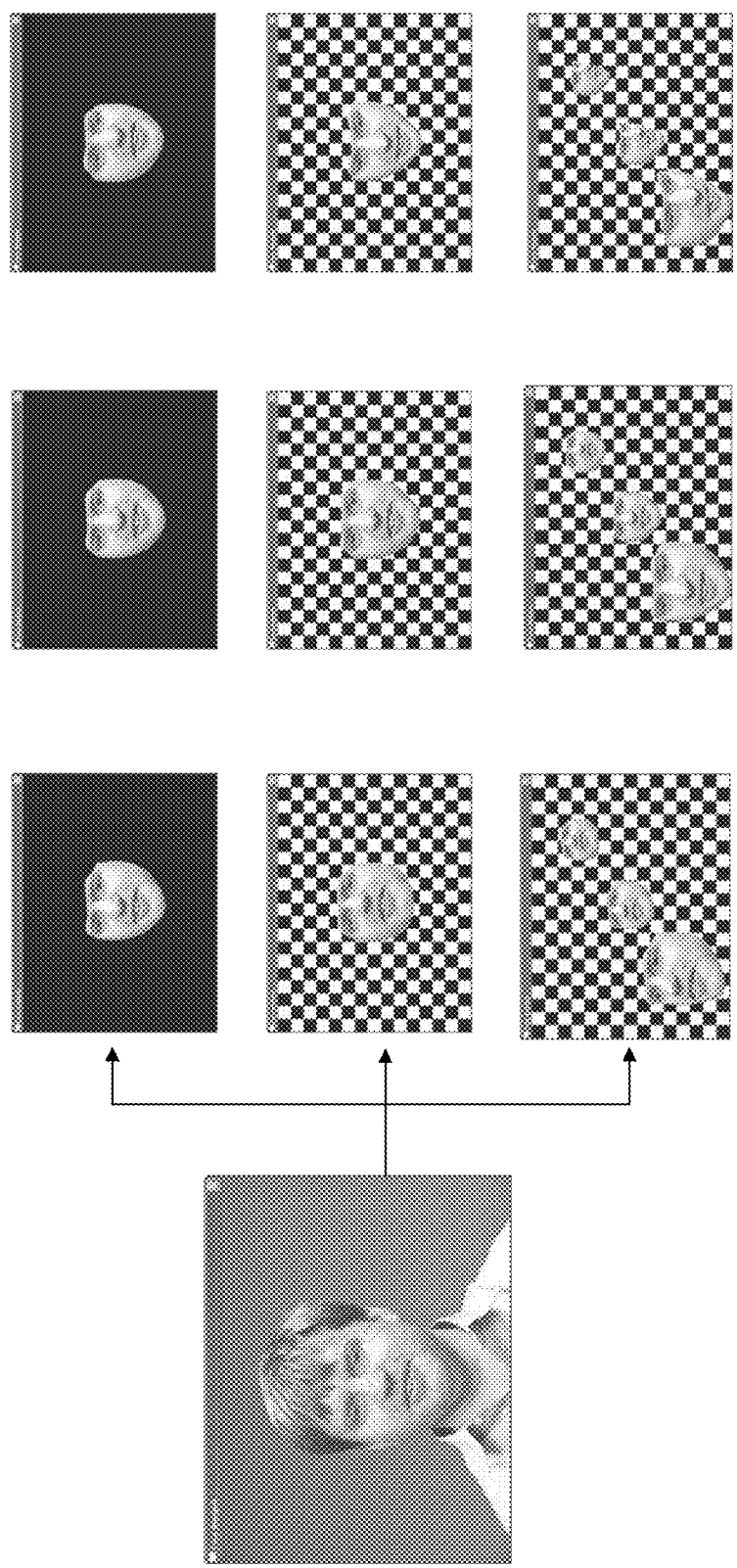
FIG. 8 illustrates examples of multiple views of a face from different angles for 3D content generation.
Figure 9:
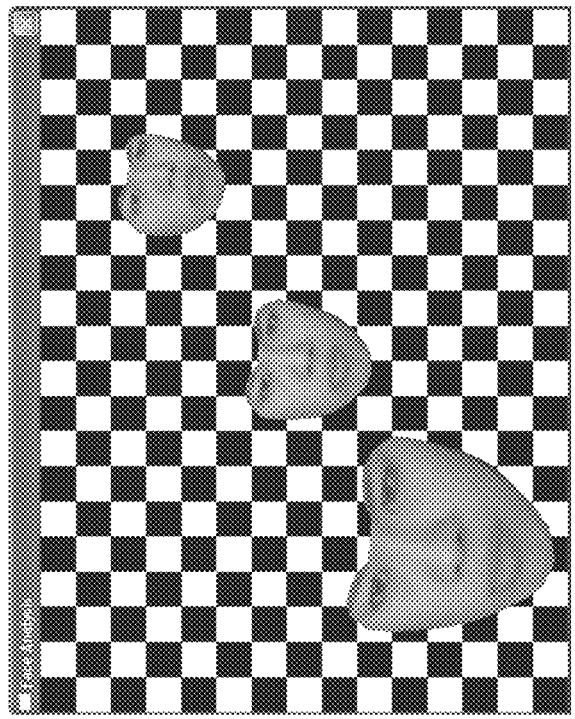
FIG. 9 illustrates 3D printing and 3D displaying.
Figure 9:
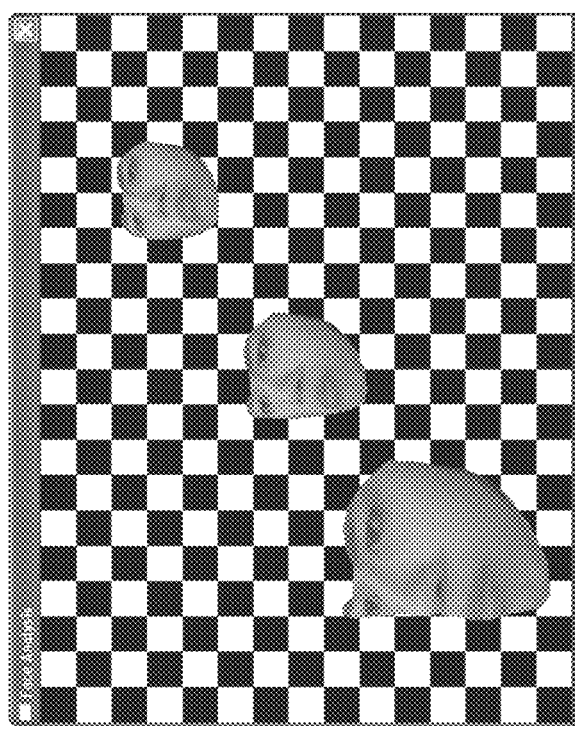

Examples of multiple views of a face from different angles for 3D content generation is illustrated in FIG. 8. As is explained above, another potential application of the present invention includes 3D printing and 3D display. An example of this type of application is illustrated in FIG. 9.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A multi-view image synthesis method for generating multiple views of an input image, said method comprising the following steps:
   (a) accessing said input image, wherein said input image is a 2-dimensional (2D) image and is the only image used to generate said multiple views;
   (b) applying an auto-detection process to said input image for detecting a predefined object-class;
   (c) in response to said auto-detection process detecting a target image region within said input image having a target image that corresponds to said predefined object-class, aligning a predefined 3-dimensional (3D) polygon mesh of said predefined object-class to the target image, said 3D polygon mesh being distant from a planar boundary shape defining an enclosed perimeter on a boundary plane, said boundary shape having anchor points at predefined locations along its perimeter and coupled to predefined vertices of said 3D polygon mesh;
   (d) positioning said boundary shape to be coplanar with the plane of the input image and to enclose said target image, coupling the aligned target image to the boundary shape; and
   (e) rotating the aligned target image in accordance with a rotation of the 3D polygon mesh and in accordance with its triangulation with said anchor points, and replacing said target image region with the rotated aligned target image within said input image.

2. The multi-view image synthesis method of claim 1, wherein each of the predefined anchor points along the perimeter of the boundary shape is coupled to a corresponding vertex along the outermost perimeter of said 3D polygon mesh.

3. The multi-view image synthesis method of claim 1, wherein said auto-detection process is a face detection process and said predefined object-class is a human face.

4. The multi-view image synthesis method of claim 1, wherein said boundary shape is a parallelogram shape.

5. The multi-view image synthesis method of claim 1, wherein:
   said predefined 3D polygon mesh of said predefined object-class has a plurality of predefined landmarks;
   the distance from said 3D polygon mesh to the planar boundary shape is a predefined distance; and
   said predefined distance is defined as a distance from said planar boundary shape to the depth center of said 3D polygon mesh.

6. The multi-view image synthesis method of claim 1, further having a pre-defined triangulation between said pre-defined 3D polygon mesh and said predefined anchor points, wherein step (d) uses said pre-defined triangulation to couple the aligned target image to said anchor points.

7. The multi-view image synthesis method of claim 1, wherein said boundary shape is of arbitrary size superimposed on said input image and not bigger than said input image.

8. The multi-view image synthesis method of claim 1, wherein said boundary shape coincides with the perimeter of the entirety of said input image.

9. The multi-view image synthesis method of claim 1, wherein following step (d), said boundary shape is expanded to align with the perimeter of the input image.

10. The multi-view image synthesis method of claim 1, wherein step (e) further includes estimating texture and lighting parameters of polygons that come into view as the aligned target image is rotated based on an analysis of texture and lighting parameters of polygons that that were visible prior to the rotating of the aligned target image.

11. A multi-view image synthesis system for generating multiple views of an input image, said system comprising the following steps:
   (a) an input node for accessing said input image, wherein said input image is a 2-dimensional (2D) image and is the only image used to generate said multiple views;
   (b) a first data processing block configured to apply an auto-detection process to said input image for detecting a predefined object-class;
   (c) a second data processing block configured to, in response to said first data processing block detecting a target image region having a target image within said input image that corresponds to said predefined object-class, align a predefined 3-dimensional (3D) polygon mesh of said predefined object-class to the target image region, said 3D polygon mesh being distant from a planar boundary shape defining an enclosed perimeter on a boundary plane, said boundary shape having anchor points at predefined locations along its perimeter and coupled to predefined vertices of said 3D polygon mesh;
   (d) a third data processing block configured to position said planar boundary shape to be coplanar with the lane of the input image and to enclose said target image, and to couple the aligned target image to the planar boundary shape;
   (e) a fourth data processing block configure to rotate the aligned target image in accordance with a rotation of the 3D polygon mesh and in accordance with its triangulation with said anchor points, and replacing said target image region with the rotated aligned target image within said input image.

12. The multi-view image synthesis system of claim 11, wherein each of the predefined anchor points along the perimeter of the boundary shape is coupled to a corresponding vertex along the outermost perimeter of said 3D polygon mesh.

13. The multi-view image synthesis system of claim 11, wherein said auto-detection process is a face detection process and said predefined object-class is a human face.

14. The multi-view image synthesis system of claim 11, wherein said boundary shape is a parallelogram shape.

15. The multi-view image synthesis system of claim 11, wherein:
   said predefined 3D polygon mesh of said predefined object-class has a plurality of predefined landmarks;
   the distance from said 3D polygon mesh to the planar boundary shape is a predefined distance; and said predefined distance is defined as a distance from said planar boundary shape to the depth center of said 3D polygon mesh.

16. The multi-view image synthesis system of claim 11, further having a pre-defined triangulation between said pre-defined 3D polygon mesh and said predefined anchor points, wherein third data processing block uses said pre-defined triangulation to couple the aligned target image to said anchor points.

17. The multi-view image synthesis system of claim 11, wherein said planar boundary shape is of arbitrary size superimposed on said input image and not bigger than said input image.

18. The multi-view image synthesis system of claim 11, wherein said planar boundary shape coincides with the perimeter of the entirety of said input image.

19. The multi-view image synthesis system of claim 11, wherein said planar boundary shape is defined to align with the perimeter of the input image.

20. The multi-view image synthesis system of claim 11, wherein said fourth data processing block further estimates texture and lighting parameters of polygons that come into view as the aligned target image is rotated based on an analysis of texture and lighting parameters of polygons that that were visible prior to the rotating of the aligned target image.

* * * * *